United States Patent [19]

Arasmith

[11] Patent Number: 4,610,928

[45] Date of Patent: Sep. 9, 1986

[54] CURVED HIGH ABSORBANCY WOOD FLAKE

[76] Inventor: Stanley D. Arasmith, P.O. Box 2458, Rome, Ga. 30164

[21] Appl. No.: 682,699

[22] Filed: Dec. 17, 1984

Related U.S. Application Data

[62] Division of Ser. No. 423,565, Sep. 27, 1982, Pat. No. 4,503,895.

[51] Int. Cl.$^4$ .............................................. B32B 21/02

[52] U.S. Cl. .................................... 428/402; 428/326

[58] Field of Search ............................... 428/402, 326

[56] References Cited

U.S. PATENT DOCUMENTS

| | | | |
|---|---|---|---|
| 4,241,133 | 12/1980 | Lund et al. | 428/326 |
| 4,246,310 | 1/1981 | Hunt et al. | 428/106 |
| 4,355,754 | 10/1982 | Lund et al. | 428/326 |
| 4,361,612 | 11/1982 | Shaner et al. | 428/402 |
| 4,384,019 | 5/1983 | Haataja | 428/106 |

*Primary Examiner*—Herbert J. Lilling
*Attorney, Agent, or Firm*—Jones & Askew

[57] ABSTRACT

An improved cutter knife for wood chip and flake producing apparatus includes shallow grooves in either the heel face or the gullet face of the knife intersecting the cutting edge and extending away from the cutting edge. The depth of the grooves is less than the depth of cut of the knife, and the grooves and corners formed by the grooves with the cutting edge provide an aggressive serrated cutting edge which penetrates into the wood and remains sharp longer than conventional cutting edges. Also disclosed is a novel wood flake material in which flake members have a larger area of exposured grain than of exposed side grain, thereby providing a short fiber length flake which can absorb moisture quickly by means of the exposed end grains, and can also dry quickly. The flake material is particularly useful as a bedding material for animals.

6 Claims, 13 Drawing Figures

CURVED HIGH ABSORBANCY WOOD FLAKE

This application is a division of application Ser. No. 423,565, filed Sept. 27, 1982. Now U.S. Pat. No. 4,503,895.

TECHNICAL FIELD

The present invention relates to the processing of wood, usually in the form of logs, into chips or flakes, and more particularly relates to an improved knife for wood processing systems and a novel wood flake produced using the knife.

BACKGROUND ART

In known wood processing machines used to convert logs into chips or flakes, it has been common for the machines to include one or more knives mounted either on the face of a rotary disc or on the circumferential surface of a rotating drum. The logs are guided or urged into the disc or drum so that the knives cut away chips or flakes of wood as the log is consumed by the knives. It is preferable to orient the log at an angle of 38 degrees with respect to the path of travel of the knives through the wood in order to minimize the power required to drive the knives across the grain of the wood.

The knives conventionally utilized in such known wood processing machines generally have a linear cutting edge formed by double grinding a metal blank to form a sharp edge between the back surface of the knife and an end (gullet) face. The cutting edges of such knives are typically two inches or more in length, and also can include wings as shown in U.S. Pat. Nos. 3,219,076 and 3,559,705. As the sharp cutting edge of a knife dulls, the knife loses the heel clearance provided between the back surface of the knife and the surface of the wood. In order to permit penetration of the sharp edge into the wood, a heel clearance angle or about two to eight degrees between the back surface of the knife and the wood should be provided. When the knife edge dulls, the heel clearance adjacent to the cutting edge disappears, and the knife tends to drag along the wood rather than penetrating into the wood. This causes the knife to dull even more quickly. More power is then required to drive the dull knife through the wood and significant resources must be utilized to change the knives and to resharpen the dull knives. Downtime of the wood processing machine is directly related to the frequency of the intervals at which the knives must be changed. Also, good penetration is required in order to cut thin flakes of wood, and therefore conventional knives that dull quickly cannot be used for continuous cutting of thin flakes.

In some known wood processing knives, a single elongated metal blank is formed into sections, as is shown in U.S. Pat. No. 2,997,082. In such patent, sharpened working edge sections which are about 1⅛" in length are separated by ⅞" non-cutting recesses. Adjacent rows of such multiple knives are staggered on a drum so that the working segments overlap as the drum rotates. In U.S. Pat. No. 2,951,518, a wood processing knife is shown in which grooves have been machined in the end (gullet) face of the knife to at least the depth of cut in order to divide the wood flake being removed from the log into separate narrow ribbons. U.S. Pat. No. 2,349,034 shows a shreading cutter which includes triangular teeth formed by grooves in the back surface of the cutter. The cutter is drawn with the grain of the wood to scratch out "wood wool" shreads or filaments. U.S. Pat. No. 2,813,557 shows a knife including a plurality of spaced forward blade edges and a plurality of integral rear wood blade edges disposed between the forward blade portions. The serrated forward blade edge is formed by grooves to the gullet face of the knife such that the size of chips is determined by the spacing between the forward teeth. It appears that the depth of cut is less than the depth of the grooves. In U.S. Pat. No. 2,825,371, chip breaking teeth 32 are spaced apart along the gullet surface of the cutting knife, the edge of which is a conventional continuous linear cutting edge. Other knife configurations in various types of wood processing machines are shown in U.S. Pat. Nos. 3,732,907; 3,304,970; 242,138; 3,011,535; 2,964,079; 4,077,450; 3,327,746; 3,907,016; 3,421,561; 3,262,476; 3,162,222; 3,059,676; 2,997,082; 2,710,635; 3,219,076; 3,559,705; and 3,195,592.

A need has existed in the wood processing art for a knife that can retain its sharpness for longer periods of time and thereby be capable of precision cutting very thin flakes from the ends of logs.

SUMMARY OF THE INVENTION

The present invention provides an improved wood processing knife that remains sharp longer than prior knives, requires less power to cut through logs, and is capable of producing a novel wood flake product, which itself is also a part of the present invention. Small, shallow grooves cut into the heel or gullet surface of the knife parallel to the direction of travel of the knife create a serrated cutting edge having sharp corners which aggressively penetrate into the wood and prevent the cutting edge from becoming rapidly dulled by dragging along the wood.

Generally described, the knife of the present invention for removing material from a wooden member is of the type having a heel face which extends, during cutting, adjacent to the wooden member, and a gullet face forming an acute angle with the heel face, the heel face and gullet face defining at the intersection thereof a transverse primary cutting edge. The invention comprises the improvement in the cutting edge comprising at least one shallow groove defined in one of the heel face and the gullet face, extending at right angles from the primary cutting edge, the groove having a depth of less than the thickness of material being removed from the wooden member, forming corners at the intersection of the groove with the primary cutting edge, and forming a secondary cutting edge at the intersection of the groove with the other of the heel face and gullet face.

In a preferred embodiment, the knife includes a plurality of rectangular shallow grooves, each including a pair of sidewalls defining the corners with the primary cutting edge, and a bottom surface parallel to the primary cutting edge to form the secondary cutting edge. The longitudinal shallow grooves in the knife are preferably spaced from one another by no more than ½", and are preferably no more than ½" wide. In the preferred embodiment disclosed herein, the grooves are 0.01" deep, ⅛" wide and are separated by ⅛".

Thus, in place of the continuous cutting edge provided in the prior art, a knife emboding the present invention provides a serrated cutting edge which includes a series of sharp corners which tend to guide and stabilize the penetration of the knife into the wood, and then pull the glade behind them. As a result, knives embodying the invention last approximately 30-150 percent longer between resharpenings than conventional knives. The efficient penetration of the serrated knife also permits even cutting of very thin flakes from the end of logs. A knife emboding the invention is also simple to sharpen since one grinding pass along the front end face of the knife sharpens both the primary and secondary cutting edges and redefines the penetrating corners.

Although a knife embodying the present invention can be used advantageously in any wood processing operation, such a knife is particularly useful in the production of a novel wood flake material which also forms a part of the present invention. The wood flake material comprises flake members having a larger area of exposed end grain than of exposed side grain, thereby providing a short fiber length flake which can absorb moisture quickly by means of the exposed end grains, and can also dry quickly. These features make the wood flake material according to the invention ideal for use as a bedding material for chickens and the like. Production of a wood flake material is made possible by the ability of a knife embodying the present invention to cut thin slices off the end of a log for significant periods without dulling.

The flake produced is sheet-like in nature, having two large parallel planar end grain surfaces connected by narrow end and side surfaces which expose the side grain. Each flake is preferably about 1" side and less than ¼" thick. The preferred thickness is about 0.04", which provides a very high ratio of end grain surface area to side grain surface area. The action of the knife in cutting the flake material imparts a curve to each flake, which tends to open the grain on the convex planar surface of the flake. This facilitates absorbtion and drying. In order to efficiently produce wood flake material embodying the invention, an elongate knife can be constructed having short serrated knife sections embodying the invention at alternating levels separated by about 0.05". The flakes produced by the knife sections at each level are separated from one another, to form separate flakes having a width equal to the width of the knife sections, which is preferably about 1".

Thus, it is an object of the present invention to provide an improved wood processing knife.

It is a further object of the present invention to provide an improved wood flake material suitable for animal bedding and the like.

It is a further object of the invention to provide a wood processing knife that penetrtes easily into the wood and resist dulling.

It is a further object of the present invention to provide a wood processing knife that is capable of sustained production of thin wood flake material cut from the end of a log.

It is a further object of the present invention to provide a wood flake material having improved rates of absorbency and drying, and which is light weight and piles loosely.

Other objects, features, and advantages of the present invention will become apparent upon review of the following detailed description of embodiments of the invention, when taken in conjunction with the drawing.

DETAILED DESCRIPTION

Figure 1:
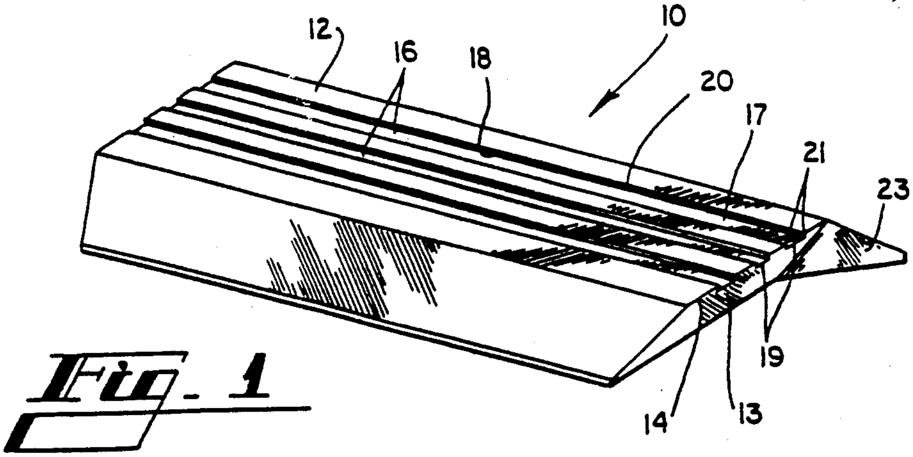
FIG. 1 is an isometric view of a knife embodying the present invention.
Figure 3:
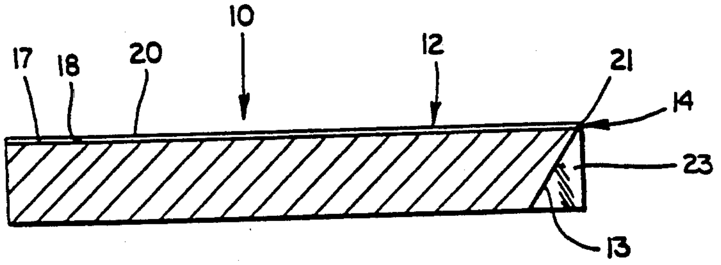
FIG. 3 is a longitudinal cross-sectional view taken along line 3—3 of FIG. 2.

Referring now in more detail to the drawing, in which like numerals represent like parts throughout the several views, FIG. 1 shows knife 10 embodying the present invention. The knife 10 is machined from a metal blank, and includes a back or top surface 12 and an end face 13 which meet to form a transverse primary cutting edge 14. The acute angle formed between the back or heel surface 12 and the end or gullet face 13 is preferably 38 degrees.

A plurality of longitudinal shallow grooves 16 are machined into the back surface 12 of the knife 10. The parallel grooves 16 intersect the end face 13, and therefore interrupt the primary cutting edge 14. Each longitudinal groove 16 includes a bottom surface 17 and a pair of sidewalls 18. The sidewalls 18 are preferably perpendicular to the back surface 12, forming a pair of square edges or shoulders 20 at the intersection of the sidewalls 18 and the back surface 12. Where the bottom surfaces 17 of the grooves 16 intersect the end face 13, a plurality of secondary transverse cutting edges 19 are formed, and the primary cutting edge 14 is interrupted and divided into segments. Where the shoulders 20 intersect the end face 13, a plurality of sharp points or corners 21 are formed. The points 21 penetrate into the wood when the cutting edges 14, 19 meet the wood, and draw the sharp edges into the wood.

Figure 2:
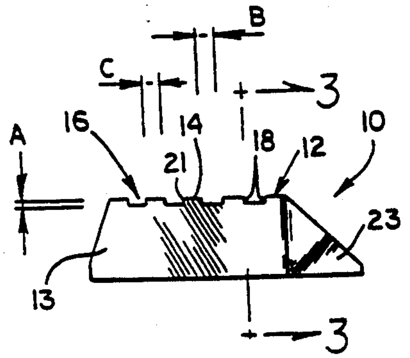
FIG. 2 is a front plan view of the knife shown in FIG. 1.

The depth of the grooves 16, shown as dimension A in FIG. 2, is less than the depth of cut into the wood, and is preferably 0.01," although such depth can be as small as "0.001." The width of the grooves 16, shown as dimension B, should be 2" or less to provide a sufficient number of penetrating corners 21. In the preferred embodiment shown, the width B is ⅛". The spacing between the grooves 16, shown as dimension C, should also be 2" or less, and preferably is ⅛".

The knife 10 also includes a wing 23 which, in a conventional manner, assists in the shaping of wood chips for the pulp industry. Shallow grooves can be machined into one of the faces of the wing if desired. The knife 10 is mounted in a manner (not shown) known to those skilled in the art in a recess in the surface of a drum or in the flat side of a disc with the cutting edge protruding beyond the surface of the drum or disc. The knife is angled to provide the proper heel clearance between the back surface 12 of the knife and the surface of the wood.

As a result of the better penetration and sharpness of the knife 10, less power is required to drive the knife through a log, so that energy requirements for producing wood chips or flakes can be reduced. For example, a drum carrying a plurality of knives 10 would be effective at a rotational speed of only 100–250 RPM. Also, the knife 10 makes a precision cut and produces less sawdust waste than conventional knives.

Figure 5:
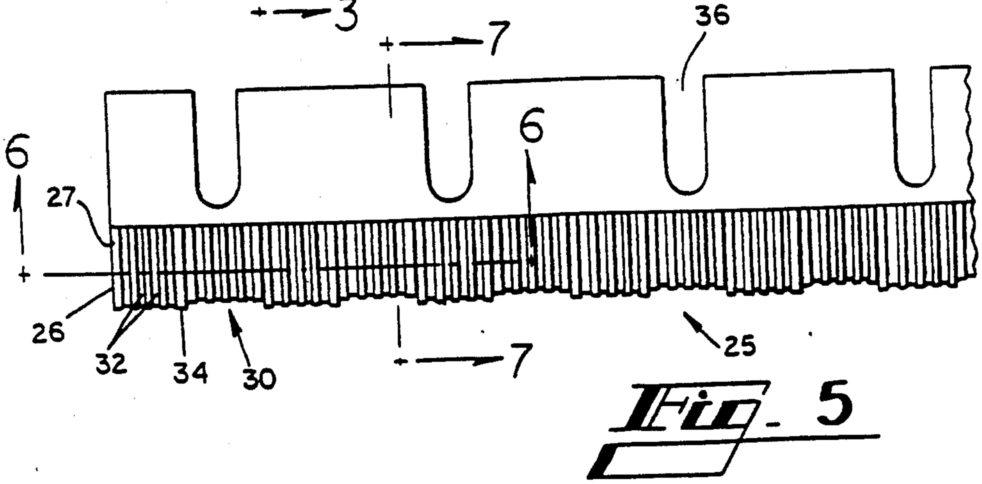
FIG. 5 is a top plan view of the knife of FIG. 4.
Figure 4:
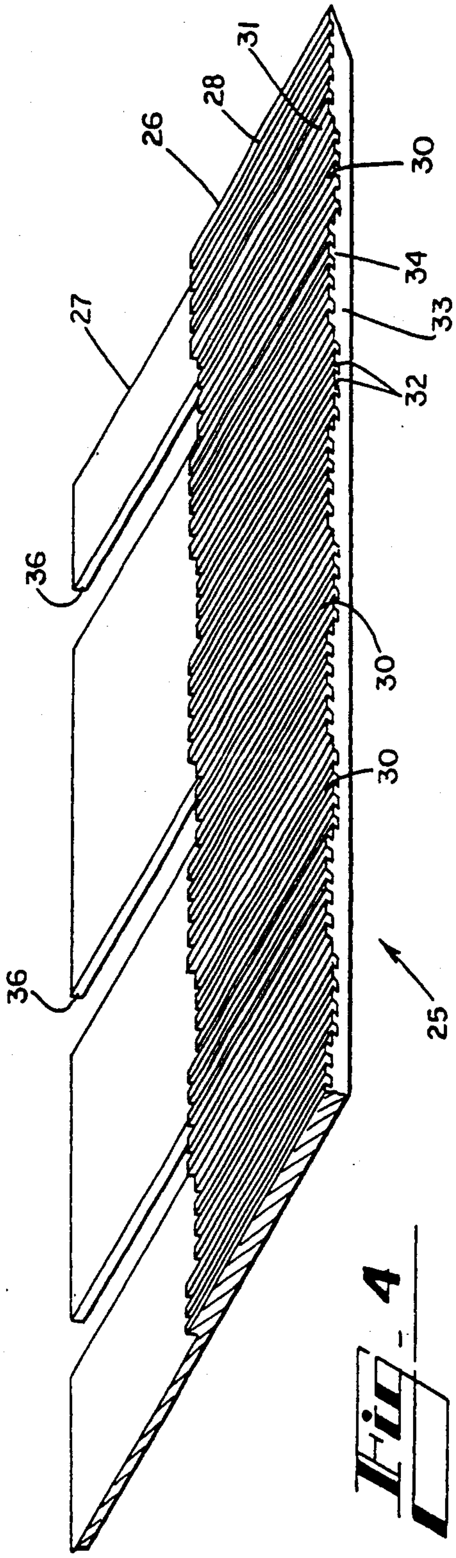
FIG. 4 is an isometric view of a second embodiment of a knife embodying the present invention.
Figure 7:
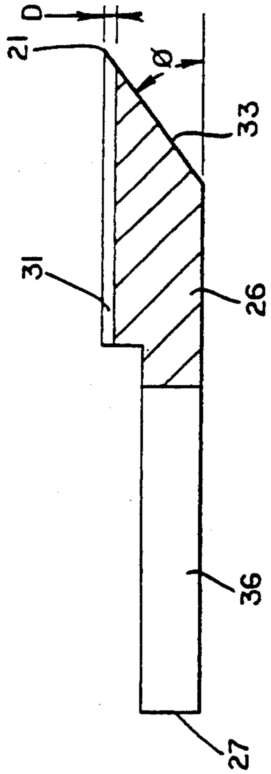
FIG. 7 is a longitudinal cross-sectional view taken along line 7—7 of FIG. 5.
Figure 6:
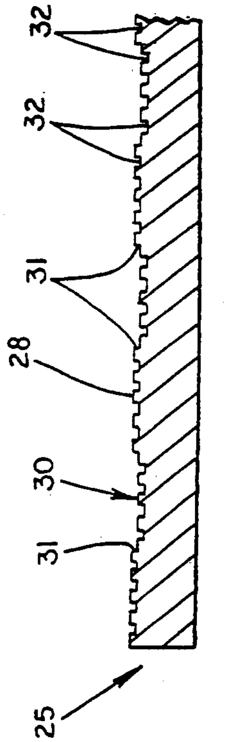
FIG. 6 is a transverse cross-sectional view taken along line 6—6 of FIG. 5.

FIG. 4 shows a second embodiment of a knife 15 constructed according to the present invention. The knife 15 has a much longer cutting edge than the knife 10, and is particularly useful in the production of wood flake material embodying the present invention. The knife 25 includes a knife portion 26 and a clamp-receiving portion 27 integrally formed from a single blank. The knife portion 26 has a back surface 28 which defines, at regular intervals across the width of the knife 25, a plurality of major grooves 30, as shown in FIGS. 4, 5 and 6. The major grooves 30 are preferably about 1" wide and 0.05 to 0.11" deep (dimension D in FIG. 7), and are separated by about 1". A pair of sidewalls 31 connect the major grooves 30 to the back surface 28 of the knife portion 26. A plurality of minor grooves 32, identical to the shallow grooves 16 described above, are machined into the knife portion 26 both at the bottom of the major grooves 30 and in the raised portions between the major grooves 30. The knife portion 26 also defines an end face surface 33 which meets the back surface 28 at an angle to define a serrated transverse cutting edge 34 which is intersected by both the major and minor grooves. The angle shown in FIG. 7, between the transverse plane of the knife 25 and the end face 33 is preferably 38 degrees.

Figure 8:
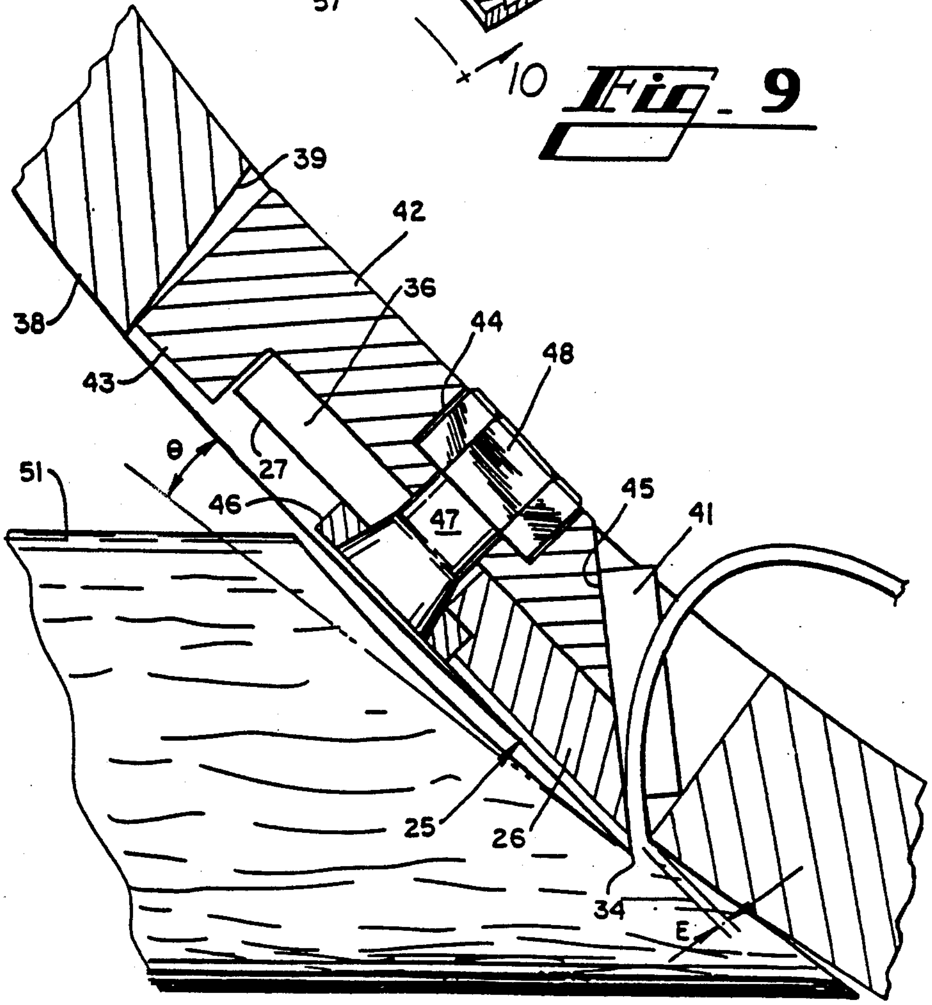
FIG. 8 is a cross-sectional view showing the knife of FIGS. 4–7 mounted in a drum-type wood processing apparatus.

The clamp-receiving portion 27 of the knife 25 comprises a flat plate into which a plurality of U-shaped clamping slots 36 have been cut, extending perpendicular to the cutting edge of the knife. The mounting of the knife 25 in a drum-type wood processing apparatus is shown in FIG. 8. The drum 38 is provided with a plurality of recesses 39 which receive the knife and clamping assembly. At the front of each recess 39, a stop 41 is provided in the plane of the desired orientation of the end face 33 of the knife 25. An L-shaped knife holder 42 rests on the bottom of the recess 39. The knife holder 42 defines an outwardly extending projection 43 and, at the opposite end of the knife holder 42, a slanting surface 45 which abuts the stop 41. The knife 25 rests on the knife holder 42 with the end face 33 abutting the stop 41 and the clamp-receiving portion 27 adjacent to the projection 43 of the knife holder 42. The clamping slots 36 of the knife 25 are aligned with openings in the knife holder 42 through which are passed clamping bolts 47. The clamping bolts 47 are flared at their upper ends to be matingly received by openings in corresponding clamp members 46, which bear down upon the clamp-receiving portion 27 of the knife 25. A nut 48 is threaded onto each clamping bolt 47 to secure the knife 25 against the knife holder 42 and the stop 41. The knife holder 42 is oriented such that the angle between the back surface of the knife and a tangent to the drum 38 taken at the point of the cutting edge 34 is between 2 degrees and 8 degrees. The angle provides heel clearance between the knife and the log which is necessary to permit the cutting edge to penetrate into the wood.

A plurality of knives 25 can be mounted axially in a parallel sequence (not shown) around the circumferential surface of the drum 38. The drum 38 rotates counter clockwise, causing the cutting edges of the knives 25 to cut wood flake material from the end of a log 51 that is urged into the drum 38 by a conventional log-handling apparatus (not shown) at an angle of approximately 38 degrees. As best shown in FIG. 8, the cutting edge 34 of the knife 25 protrudes beyond the periphery of the drum 38 by a distance E which is less than ¼" and is preferably only 0.03 to 0.09." This distance E defines the depth of cut of the knife 25 into the log. Preferably, they are spaced apart by a distance that causes two knives to be engaging the log at all times.

As the cutting edge 34 of the knife 25 enters the end of the log 51, the plurality of sharp corners formed at the intersection of both the major and minor grooves with the end face 33 penetrate into the wood and cause the knife 25 to make a precision cut through the end grain of the log, leaving behind grooves in the end of the log corresponding to the raised portions of the knife 25 between the major grooves 30. The next knife 25 on the drum is aligned with the path of the preceding knife, with a groove 30 following a raised portion. As the following knife following a groove 30, and a raised portion engages the log 51, a similar cut is made in the log. Since the grooves 30 are deeper (dimension D) than the depth of cut E, no bridging material will connect the individual flakes formed by the alternating grooves and raised portions. Thus, the knives 25 will form individual flakes of the type shown in FIG. 9. The flake material being separated from the log tends to fracture transversely at intervals of about 1" more or less as the result of the pressure of the knife 25 moving through the log. The length can be controlled somewhat by varying the speed of rotation of the drum 38. The action of the knife 25 tends to curl the wood flake away from the log, imparting a curve to the wood flake material. The presence of the minor grooves 32 of the knife give the wood flake material a ribbed texture.

Figure 9:
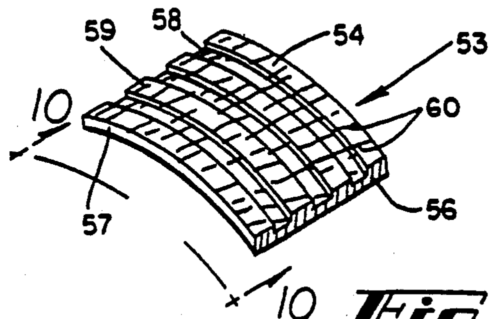
FIG. 9 is an isometric view of a wood flake emboding the present invention.
Figure 10:
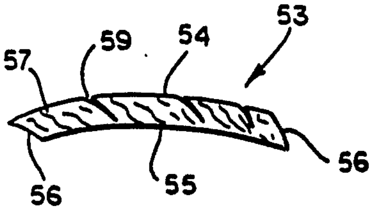
FIG. 10 is a side-plan view of the wood flake of FIG. 9.

FIGS. 9 and 10 show a wood flake 53 embodying the present invention, produced by the knife 25 described above. The wood flake 53 includes a top surface 54 and a bottom surface 55, both of which comprise end grain surface area. The flake also includes two parallel ends 56 and two parallel sides 57, all of which comprise side grain surface area. The predominance of end grain surface area over side grain surface area is the result of the shallow depth of cut of the knife 25 across the end grain of the log being processed.

The length and width of the wood flake 53 are determined by the characteristics of the knife 25, and the thickness of the wood flake 53 is determined by the depth of cut, as noted above. The dimensions of a wood flake embodying the invention are selected to make the area of the surfaces 54 and 55 exceed the area of the surfaces 56 and 57. The preferred wood flake 53 is about 1" wide by 1" long or more by less than 0.09" thick, resulting in a ratio of end grain surface area to side grain surface area of more than 5:1. Because the end grain surface area of the flake is larger than the side grain surface area, the wood fibers of the flake are relatively short. The flake is highly absorbent as the result of presenting the wick-like end grains for contact with the liquid to be absorbed. By the same token, liquid can escape more readily from the short fibers of the wood flake, permitting efficient drying.

The precision action of the knife 25 cutting across the end grains of a log leaves grooves 58 separated by ribs 59, running the length of the wood flake 53. Such grooves and ribs are the result of the minor grooves 32 of the knife 25. The action of the knife 25 also imparts a curved shape to the flake, as best seen in FIG. 10. The curving of the flake 53 tends to thin out the grain of the flake, resulting in slight openings 60 of the grain of the flake at intervals along the top or convex surface 54 of the flake 53. The openings 60 further increase the absorbtion and drying efficiency of the flake. Also, the curvature of the flake and the grooves 58 and ribs 59 result in loose or fluffy packing of significant volumes of the flakes. This permits air circulation through the flakes which promotes freshness and dryness of a volume of the flakes when used in applications such as animal bedding material.

The wood flakes 53 are cut to a precision thickness by the knife 25, and the presence of the major grooves 30 in the knife 25 result in wood flakes having a reasonably consistent width approximately equal to the width of the major grooves and the raised portions between the major grooves, as a result of the fracturing described above. However, the length of the wood flakes 53, that is, the length of the side surfaces 57, can vary from approximately ⅛" to 1". As the knife 25 passes through the log, as shown in FIG. 8, the mechanical force of the knife on the thin flake material being separated from the log causes the flake material to fracture and to break away from the material being separated from the log. Depending on the strength of the wood, the angle between the path of travel of the cutting edge and the grain of the wood, the depth of cut and other factors, the wood flake material may fracture at various lengths. However, because the wood flake is so thin, the area of exposed end grain surface is larger than the exposed side grain surface, even if the length of the sides 57 is relatively short. Of course, the length of the flakes may also be reduced by breakage during physical handling of the flakes subsequent to production.

The wood flake 53 also makes a good fuel which burns efficiently and completely as a result of the size and shape of the flakes and the capability of good air circulation through the wood flake material. Production of the flakes from waste wood material is efficient using the knife 25 embodying the invention because of the low power requirements for driving the knife 25 through the logs. Furthermore, several logs can be processed at once when knives 10 or 25 are mounted on a drum of sufficient length.

Figure 11:
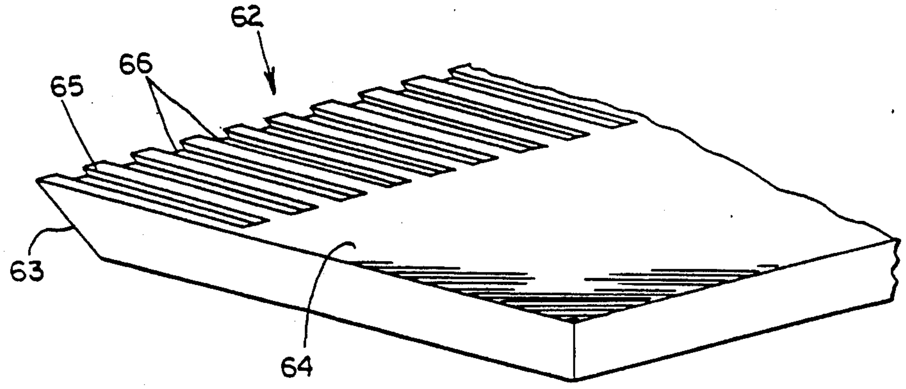
FIG. 11 is a partial isometric view of a third embodiment of the invention in a chipper disc knife.
Figure 12:
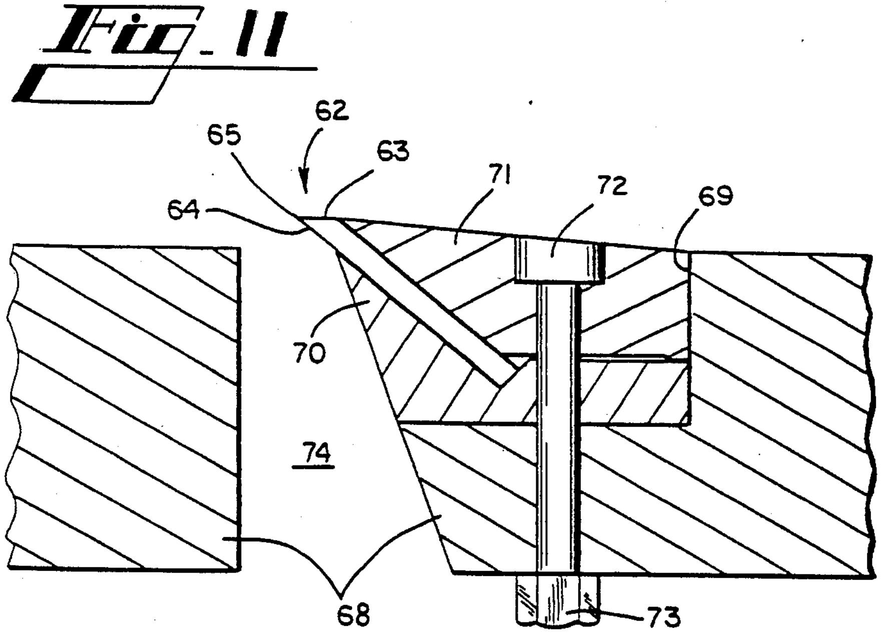
FIG. 12 is a top cross-sectional view of the knife of FIG. 11 mounted in a disc.

FIGS. 11 and 12 show a third embodiment of the invention in a knife 62 primarily intended for use in a chipper disc. The intersection of a heel face 63 and a gullet face 64 form a primary cutting edge 65. Shallow grooves 66 of the type formed in the knife 10 of FIG. 1 are machined into the gullet face 64 at right angles from the cutting edge 65.

The knife 62 is shown mounted in a chipper disc 68 in FIG. 12. The disc 68 defines a recess which receives a knife holder 70, the knife 62, and a clamp 71. A bolt 72 is countersunk into the clamp 71 and passes through the knife holder and the disc and is fitted with a nut 73. Force is exerted by the bolt 72 on the clamp 71 to hold the knife 62 at a proper angle so that the heel face 63 provides proper heel clearance with respect to the log (not shown). The cutting edge 65 extends partially over a gullet 74 which passes through the disc 68 to allow chips removed from the log to pass through the disc for collection. The grooves 66 perform the same function as the grooves shown in the other embodiments, although they are machined in the gullet face of the knife rather than in the heel face. As in prior embodiments, the depth of the groove 66 is less than the depth of cut into the log, and thereby function to improve the cutting edge rather than to separate or define the size of chips being removed from the log.

Figure 13:
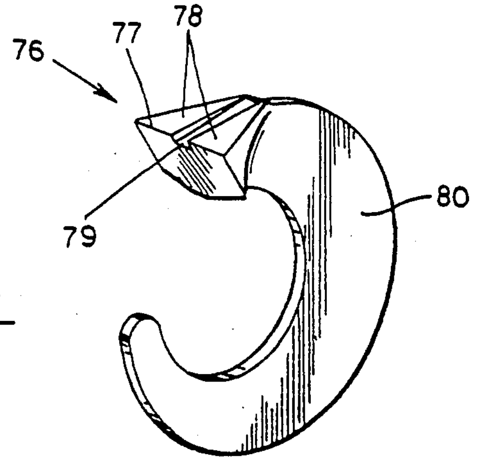
FIG. 13 is an isometric view of a fourth embodiment of the invention in a saw tooth.

FIG. 13 shows a fourth embodiment of the invention in a saw tooth 76. The saw tooth 76 includes a cutting edge 77. A heel face 78 of the saw tooth includes a shallow groove 79 extending at right angles from the cutting edge 77. The tooth 76 also includes a shank 80 for attachment to a saw blade in a manner well known to those skilled in the art. Although more than one shallow groove 79 can be machined into a saw tooth, the embodiment shown in FIG. 13 demonstrates that the advantages of the invention can be incorporated into small cutting elements, and the improvement provided by the invention will be noticeable even if only a single groove is provided.

While this invention has been described in detail with reference to preferred embodiments thereof, it will be understood that variations and modifications can be made within the spirit and scope of the invention as described here and above and as defined in the appended claims.

What is claimed is:

1. A high absorbency, quick-drying wood flake material comprising curved flake members each defining spaced apart top and bottom surfaces, the grain of said wood running between said top and bottom surfaces to define fibers having an average fiber length less than one-fourth inch; said top and bottom surfaces providing exposed end grain surface larger than the side grain surfaces of said flake member by a ratio of at least 2:1.

2. The flake material of claim 1, wherein said flake members are about one inch wide by about one inch long by about 0.03 to 0.09 inch thick, said thickness being the dimension running with the grain.

3. The flake material of claim 1, wherein said flake members have an average longest transverse dimension greater than one-half inch, and a thickness with the grain less than 0.09 inch.

4. The flake material of claim 1, wherein said flake members are curved so as to open portions of exposed end grain surface area.

5. The flake material of claim 4, wherein said flake members define a plurality of ribs extending around the curvature of said flake members.

6. The flake material of claim 1 wherein the ratio of end grain surface to side grain surface is at least 5:1.

* * * * *